(12) United States Patent
Johnson (10) Patent No.: US 6,920,394 B2
(45) Date of Patent: Jul. 19, 2005

(54) METHOD AND APPARATUS FOR DETERMINING THE ELEVATION OF AN UNDERGROUND STRUCTURE

(75) Inventor: Orwic Antony Johnson, Indianapolis, IN (US)

(73) Assignee: The Schneider Corporation, Indianapolis, IN (US)

( * ) Notice: Subject to any disclaimer, the term of this patent is extended or adjusted under 35 U.S.C. 154(b) by 0 days.

(21) Appl. No.: 10/664,521

(22) Filed: Sep. 17, 2003

(65) Prior Publication Data

US 2005/0060095 A1 Mar. 17, 2005

(51) Int. Cl.[7] ............................................... G01C 9/00
(52) U.S. Cl. ............................ 702/6; 33/281; 702/150
(58) Field of Search .................... 702/2, 5, 6, 150–153; 33/281–285; 356/3.01

(56) References Cited

U.S. PATENT DOCUMENTS

| | | | | |
|---|---|---|---|---|
| 4,155,648 A | * | 5/1979 | Ferguson | 356/140 |
| 4,295,201 A | * | 10/1981 | Wiklund | 702/158 |
| 4,355,895 A | * | 10/1982 | Cairns et al. | 356/141.1 |
| 4,364,175 A | * | 12/1982 | Levake et al. | 33/1 H |
| 4,981,353 A | * | 1/1991 | Murakawa et al. | 356/3.01 |
| 5,337,149 A | * | 8/1994 | Kozah et al. | 356/601 |
| 5,528,518 A | * | 6/1996 | Bradshaw et al. | 702/150 |
| 5,671,160 A | * | 9/1997 | Julian | 702/94 |
| 5,929,807 A | * | 7/1999 | Viney et al. | 342/357.06 |
| 6,094,625 A | * | 7/2000 | Ralston | 702/150 |
| 6,473,716 B1 | * | 10/2002 | Ohishi et al. | 702/152 |
| 6,751,553 B2 | * | 6/2004 | Young et al. | 702/5 |

OTHER PUBLICATIONS

Leica Geosystems AG, DISTO Classic User Manual, 2000, pp. 1–63.
Macklan–Duncan, SMARTTOOL Builder's Angle Finder Owner's Manual, 1996, 2 pgs.
Five (5) pictures showing a jig for holding a DISTO Classic and SMARTTOOL. The jig has been in use since Sep., 2001.

\* cited by examiner

*Primary Examiner*—Donald McElheny, Jr.
(74) *Attorney, Agent, or Firm*—Barnes & Thornburg LLP (57) ABSTRACT

A survey device for determining an elevation of a subterranean architectural feature includes a distance sensor operable to generate a first signal indicative of a line-of-sight distance from the survey device to the subterranean architectural feature. The device also includes an angle sensor operable to generate a second signal indicative of an angular position of the survey device relative to a vertical reference. A processor is electrically coupled to both the distance sensor and the angle sensor. A method of operating a survey device is also disclosed.

26 Claims, 8 Drawing Sheets

METHOD AND APPARATUS FOR DETERMINING THE ELEVATION OF AN UNDERGROUND STRUCTURE

FIELD OF THE DISCLOSURE

The present disclosure relates generally to surveying instruments, and more particularly to a method and apparatus for determining the elevation of an underground structure.

BACKGROUND OF THE DISCLOSURE

During performance of a construction project, it is often necessary to determine the actual elevation of an underground feature. For example, subsequent to completion of an underground sewer system, it is often necessary to determine the actual elevation of features such as underground flow lines and the like relative to the elevation of such features called for in the engineering drawings. These actual measurements, generally referred to as "as built measurements," or simply "as builts," are useful for future planning since the actual elevations of underground structures often vary, in some cases significantly, from their planned locations. Moreover, in the case of an underground sewer system, "as built measurements" are used to confirm that the various pipe sections of the sewer system are orientated at a proper elevation relative to one another to ensure that waste water flows in the proper direction through the sewer system.

The procurement of "as built measurements" is often difficult. The elevation of the structure being measured is often difficult to determine without physically accessing the structure. For example, in the case of a sewer system, it is difficult to obtain the elevation measurement of the end of a pipe without physically climbing into the sewer to obtain the measurement.

SUMMARY OF THE DISCLOSURE

According to one illustrative embodiment, there is provided a survey device for determining an elevation of a subterranean architectural feature. The survey device includes a first sensor operable to generate a first signal indicative of a line-of-sight distance from the survey device to the subterranean architectural feature and a second sensor operable to generate a second signal indicative of an angular position of the survey device relative to a vertical reference. The survey device also includes a processor electrically coupled to both the first sensor and the second sensor.

In regard to another illustrative embodiment, there is provided a method of operating a survey instrument to determine an elevation of a subterranean architectural feature. The method includes the steps of determining a line-of-sight distance from the survey instrument to the subterranean architectural feature and generating a first signal in response thereto, determining an angular position of the survey instrument relative to a vertical reference and generating a second signal in response thereto, and calculating the elevation of the subterranean architectural feature in response to generation of the first signal and the second signal.

In regard to a yet another illustrative embodiment, there is provided a survey instrument. The survey instrument includes a distance sensor, an angle sensor, a processor electrically coupled to the distance sensor and the angle sensor, and a memory device electrically coupled to the processor. The memory device has stored therein a plurality of instructions which, when executed by the processor, cause the processor to operate the distance sensor to determine a line-of-sight distance from the survey instrument to a subterranean architectural feature and generate a first signal in response thereto, operate the angle sensor to determine an angular position of the survey instrument relative to a vertical reference and generate a second signal in response thereto, and calculate the elevation of the subterranean architectural feature in response to generation of the first signal and the second signal.

In regard to yet further illustrative embodiment, there is provided a method of operating a survey instrument to determine an elevation of a subterranean architectural feature. The method includes the steps of determining a line-of-sight distance from the survey instrument to the subterranean architectural feature and generating a first signal in response thereto, determining an angular position of the survey instrument relative to a vertical reference and generating a second signal in response thereto, and displaying the elevation of the subterranean architectural feature on a display device in response to generation of the first signal and the second signal.

In regard to yet a further illustrative embodiment, there is provided a survey instrument. The survey instrument includes a distance sensor, an angle sensor, a display device, a processor electrically coupled to each of the distance sensor, the angle sensor, and the display device, and a memory device electrically coupled to the processor. The memory device has stored therein a plurality of instructions which, when executed by the processor, cause the processor to operate the distance sensor to determine a line-of-sight distance from the survey instrument to a subterranean architectural feature and generate a first signal in response thereto, operate the angle sensor to determine an angular position of the survey instrument relative to a vertical reference and generate a second signal in response thereto, and display the elevation of the subterranean architectural feature on the display device in response to generation of the first signal and the second signal.

In regard to still a further illustrative embodiment, there is provided a method of operating a survey instrument to determine an elevation of a pipe in a sewer. The method includes the steps of determining a line-of-sight distance from the survey instrument to the pipe and generating a first signal in response thereto, determining an angular position of the survey instrument relative to a vertical reference and generating a second signal in response thereto, and calculating the elevation of the pipe in response to generation of the first signal and the second signal.

The above and other features of the present disclosure will become apparent from the following description and the attached drawings.

DETAILED DESCRIPTION OF AN ILLUSTRATIVE EMBODIMENT

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Figure 1:
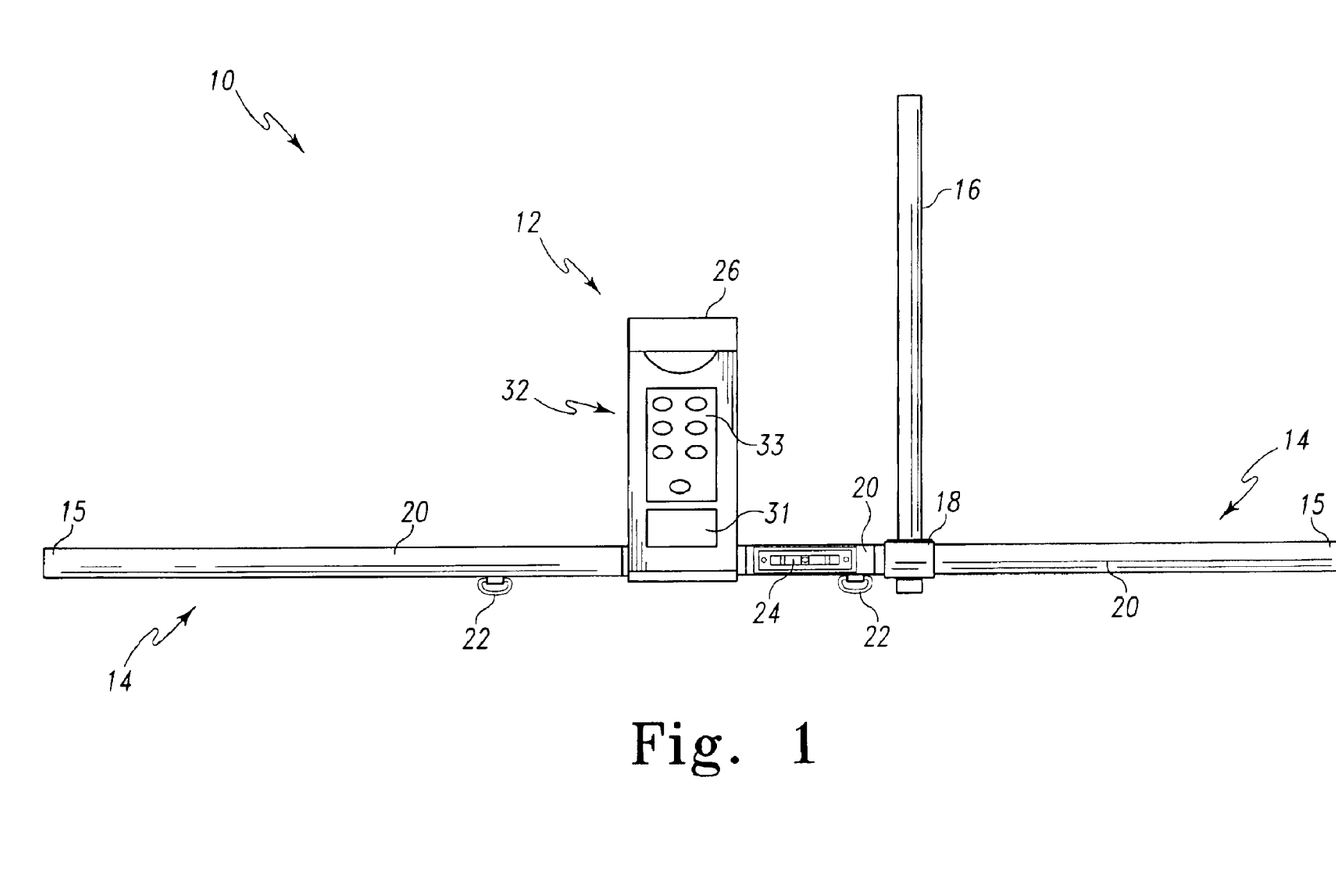
FIG. 1 is an elevation view of a survey device which incorporates the features of the present disclosure therein.

As illustrated in FIG. 1, one embodiment of a survey device 10 for determining an elevation of a subterranean architectural feature includes a survey instrument 12 secured to a support frame 14. The support frame 14 includes a cross bar 15 and a stabilizer bar 16 rotatably coupled to the cross bar 15 via a coupler 18. The stabilizer bar 16 is coupled to the support frame 14 at approximately a 90° angle, however, other coupling angles may be used in some implementations. The coupler 18 allows the cross bar 15 and survey instrument 12 to be rotated while the stabilizer bar 16 remains in a relatively fixed position. The coupler 18 is configured to be adjustably tightened so as to secure the support frame 14 in a fixed position or, alternatively, allow the rotation of the cross bar 15.

In the illustrative embodiment shown in FIG. 1, the components of the frame 14 (i.e., the cross bar 15 and the stabilizer bar 16) are embodied as steel, cylindrical bars. However, the bars 15, 16 may include other geometric cross sections such as squares, rectangles, ovals, and the like. The bars 15, 16 may be formed from a variety of materials which are rigid enough to support the survey instrument 12 and span a gap (e.g. a manhole opening) without deformation such as steel, iron, aluminum, plastic, fiberglass, and the like.

In some embodiments, the cross bar 15 may be formed from a number of individual sections 20. The sections 20 may be disassembled and separated from each other so as to decrease the overall size of the survey device 10 and increase the ease of storage and transportation of the device 10. In the illustrated embodiment of FIG. 1, the survey instrument 12 remains coupled to one of the member sections 20 during disassembly of the device 10; however, in other embodiments, the survey instrument 12 may also be detached from the sections 20 during storage, transportation, or during other desirable times. Before operation of the survey device 10, the sections 20 are assembled and secured to each other to form the support frame 14. The individual sections 20 may be coupled to each other by use of a number of securing devices 22 such as quick-disconnect pins, screws, bolts, pressure fittings, and the like.

The survey device 10 may also include a level indicator 20 secured to the support frame 14. The indicator 20 provides a visual indication of the horizontal angular position of the device 10. For example, if one end of the support frame 14 is elevated relative to the opposite end, the level indicator 20 provides the user with a visual indication that the device 10 is not horizontally level. The user may then adjust the survey device 10 so as to horizontally level the device 10. The user may adjust the device 10, for example, by positioning a number of spacers under the low side of the frame 14. Although the level indicator 20 shown in FIG. 1 is a bubble level, other types of indicators may be used. For example, electronic level indicators may be used in some applications.

Figure 2:
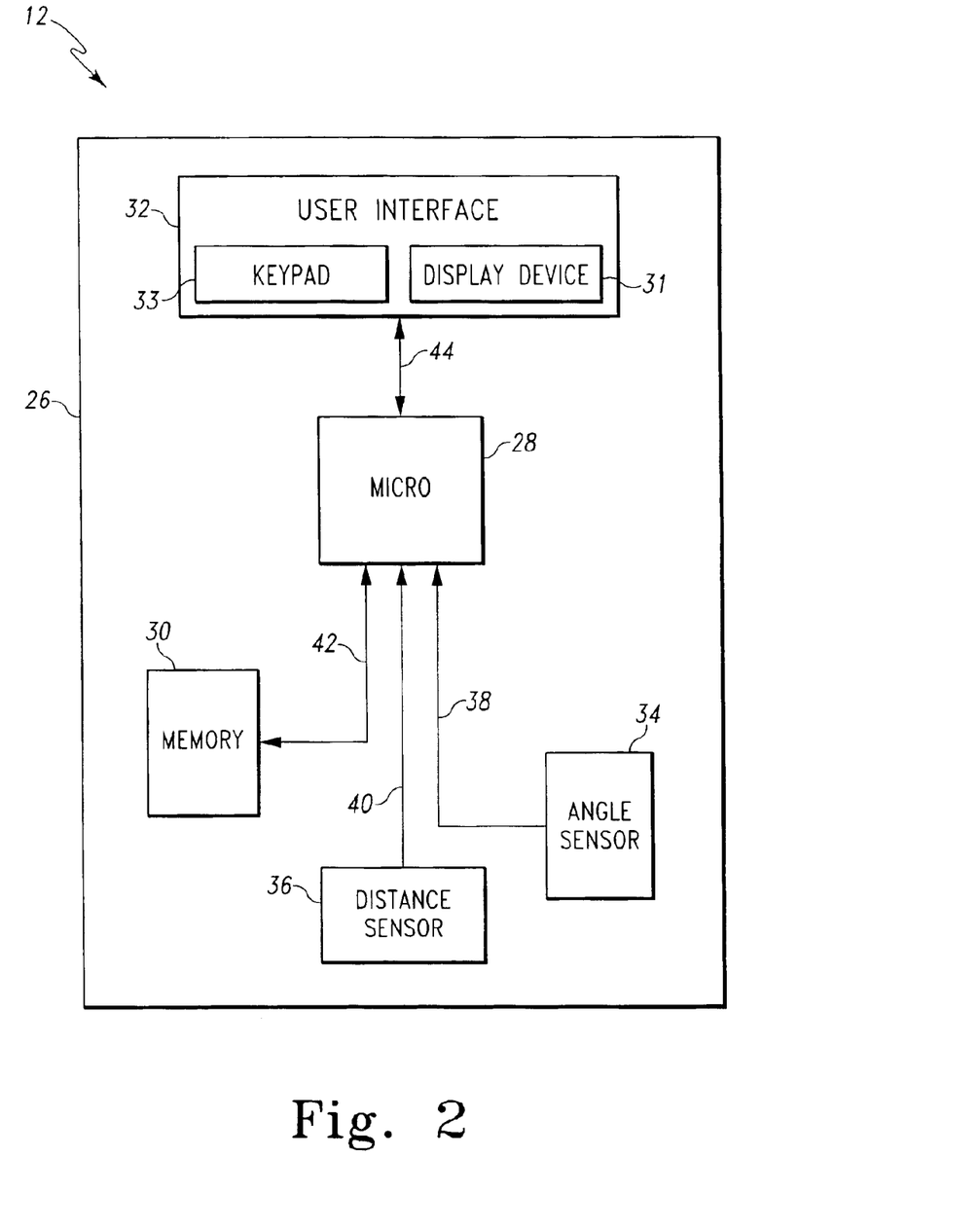
FIG. 2 is a block diagram of a processing unit of the survey device of FIG. 1.

The survey instrument 12 includes a microprocessor 28, a memory device 30, and a user interface 32 positioned in a housing 26 as illustrated in FIG. 2. The user interface 32 includes a display device 31 and a keypad 33 as shown in FIG. 1. The display device 31 may be embodied as any type of electronic display device capable of displaying information to a user. For example, the display device 31 may be a light emitting diode (LED) display device, a liquid crystal display (LCD) device, or the like. The keypad 33 may include a number user input devices such as keys, buttons, and switches. The keypad 33 allows the user to interface with the device 10 by submitting commands such as processing and display commands to the device 10.

The survey instrument 12 also includes an angle sensor 34 and a distance sensor 36. The angle sensor 34 is electrically coupled to the microprocessor 28 by a number of electrical interconnects 38. During operation, the angle sensor 34 transmits angular sensory data to the microprocessor 28 via the interconnects 38. Similarly, the distance sensor 36 is electrically coupled to the microprocessor 28 by a number of electrical interconnects 40. The distance sensor 36 produces a visual indication such as a laser dot on the area or feature at which the sensor 36 is pointing. Additionally, the distance sensor 36 produces distance sensory data and transmits the data to the microprocessor 28 via the interconnects 40. The interconnects 38, 40 may be formed from such devices as wires, cables, wireless connections such as infrared (IR) or radio frequency (RF) connections, printed circuit board traces, and other devices capable of communicatively coupling the sensors 34, 36 to the microprocessor 28.

The angle sensor 34 may be embodied as any type of electronic device utilized to determine angles. For example, the angle sensor 34 may be embodied as the electronic assembly of a commercially available angle finder that has been modified to generate an output suitable for presentation to the microprocessor 28 in lieu of a human readable output. For instance, in one specific implementation, the angle sensor 34 is embodied as, with modification thereof, the electronics assembly of a SmartTool Electronic Angle Finder which is commercially available from Macklanburg-Duncan of Oklahoma City, Okla.

Figure 3:
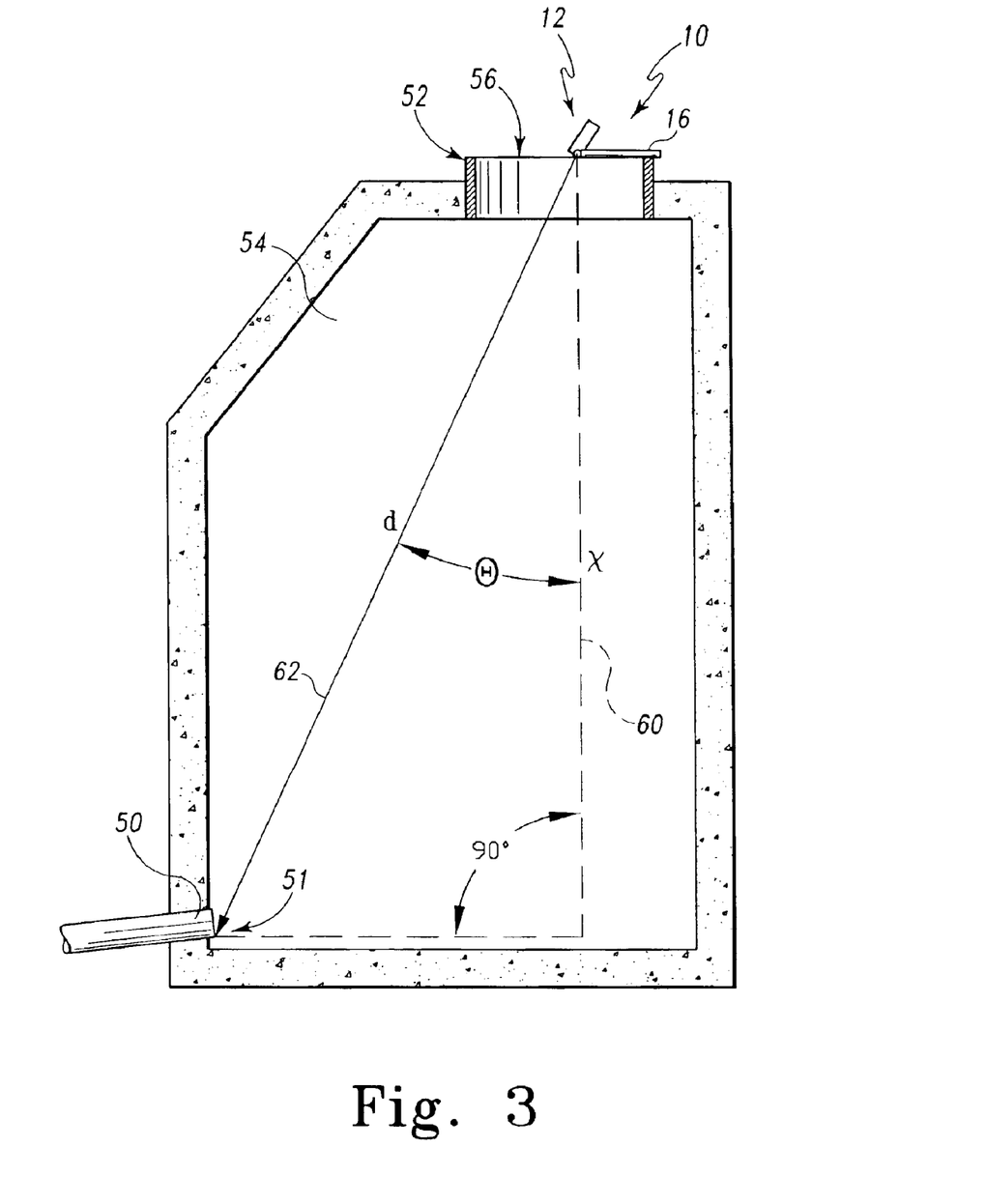
FIG. 3 is a fragmentary side elevation view of the survey device of FIG. 1 positioned over an access portal of a subterranean chamber.

As such, the angle sensor 34 generates an output signal that is indicative of the angular position of the instrument 12 relative to a vertical reference line 60, as described herein in greater detail in regard to FIG. 3. Such an output signal from the sensor 34 may include a complete data representation of the angular position of the instrument 12 (i.e., the value of an angle θ defined between a line-of-sight line 62 and the vertical reference line 60). Alternatively, the angle sensor 34 may be configured to output data that is used by the microprocessor 28 to calculate the angular position of the instrument 12 (i.e., the sensor 34 may output data that is not the actual value of the angle θ, but is used by the microprocessor 28 to calculate such a value). It should be appreciated that in both cases the angle sensor 34 outputs a signal indicative of the angular position of the instrument 12 relative to the vertical reference line 60 (albeit directly or indirectly).

The distance sensor 36 may be embodied as any type of electronic device utilized to determine distances. For example, the distance sensor 36 may be embodied as the electronic assembly of a commercially available distance finder that has been modified to generate an output suitable for presentation to the microprocessor 28 in lieu of a human readable output. For instance, in one specific implementation, the distance sensor 36 is embodied as, with modification thereof, the electronics assembly of a DISTO-classic Laser Distancemeter which is commercially available from Leica Geosystems AG of Heerbrugg, Switzerland.

As such, the distance sensor 36 generates an output signal that is indicative of the line-of-sight distance from the sensor 36 to a subterranean architectural feature 50 (or a portion thereof), as described herein in greater detail in regard to FIG. 3. Such an output signal from the sensor 36 may include a complete data representation of the line-of-sight distance to the feature 50 (i.e., the actual measured length from the sensor 36 to the feature 50 may be encoded in the signal). Alternatively, the distance sensor 36 may be configured to output data that is used by the microprocessor 28 to calculate the line-of-sight distance from the sensor 36 to the feature 50 (i.e., the sensor 36 may output data that is not the actual measured length, but is used by the microprocessor 28 to calculate such a length). It should be appreciated that in both cases the distance sensor 36 outputs a signal indicative of the line-of-sight distance from the sensor 36 to the feature 50 (albeit directly or indirectly).

The microprocessor 28 is further coupled to the memory device 30 via electrical interconnects 42. The interconnects 42 may be formed from such interconnects as wires, cables, printed circuit board traces, and the like. In the illustrated embodiment of FIG. 2, the memory device 30 is external to the microprocessor 28 and may be embodied as an external memory chip or card. Alternatively, the memory device 30 may be internal to the microprocessor 30 (e.g., level one cache memory or the like).

The microprocessor 28 performs computations based on the sensory data received from the sensors 34, 36. During such computations, the microprocessor 28 may store the sensory data and other data useful in the computations in the memory device 30. Additionally, the microprocessor 28 may retrieve the stored data or other previously stored data from the memory device 30 during the operation of the survey device 10, for example, during computation processes. The microprocessor 28 transmits the computation results to the user interface 32 via a number of electrical interconnects 44 such as wires, printed circuit board traces, ribbon cables, and the like. The computation results are presented to the user by the display device 31 of the user interface 32. The user may provide instructions, commands, requests, and other types of input to the survey device 10 via the keypad 33 located on user interface 32. Data indicative of such user provided instructions is transmitted to the microprocessor 28 from the user interface 32 via the interconnects 44.

Figure 4:
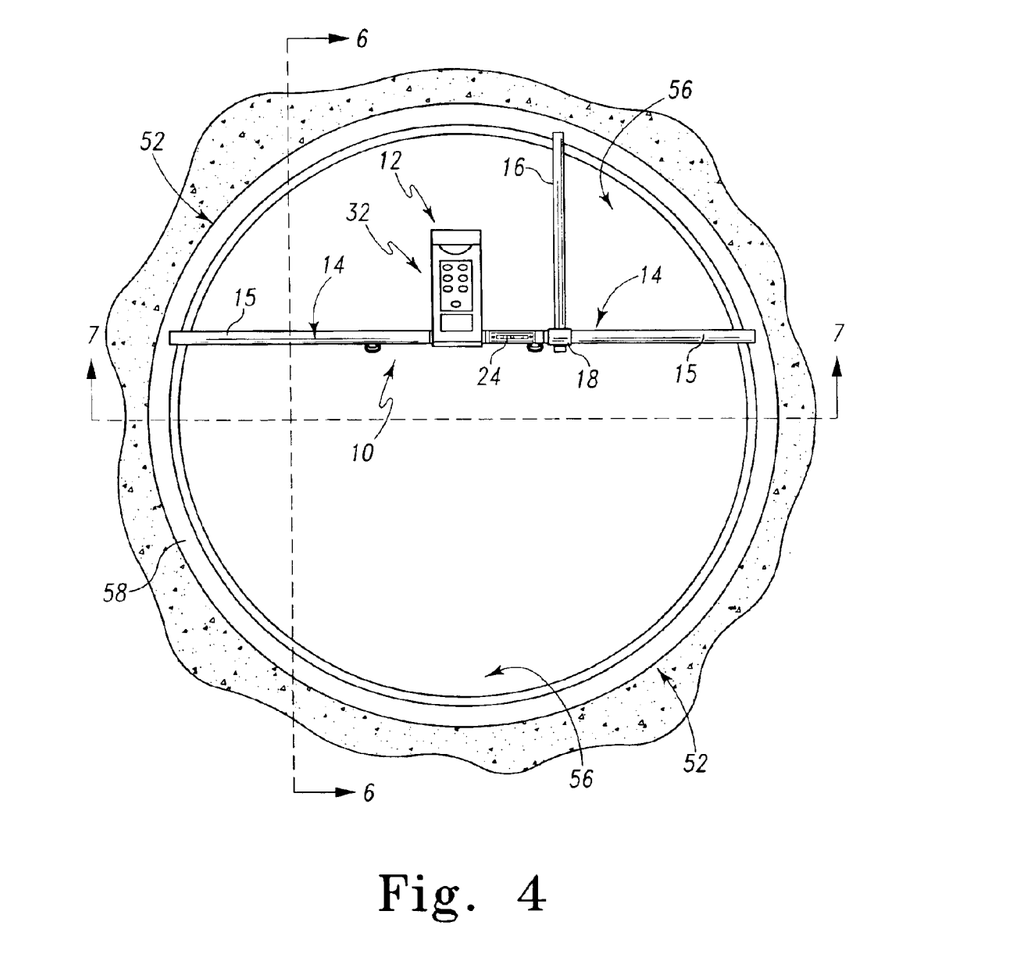
FIG. 4 is a plan view of the survey device of FIG. 3.
Figure 5:
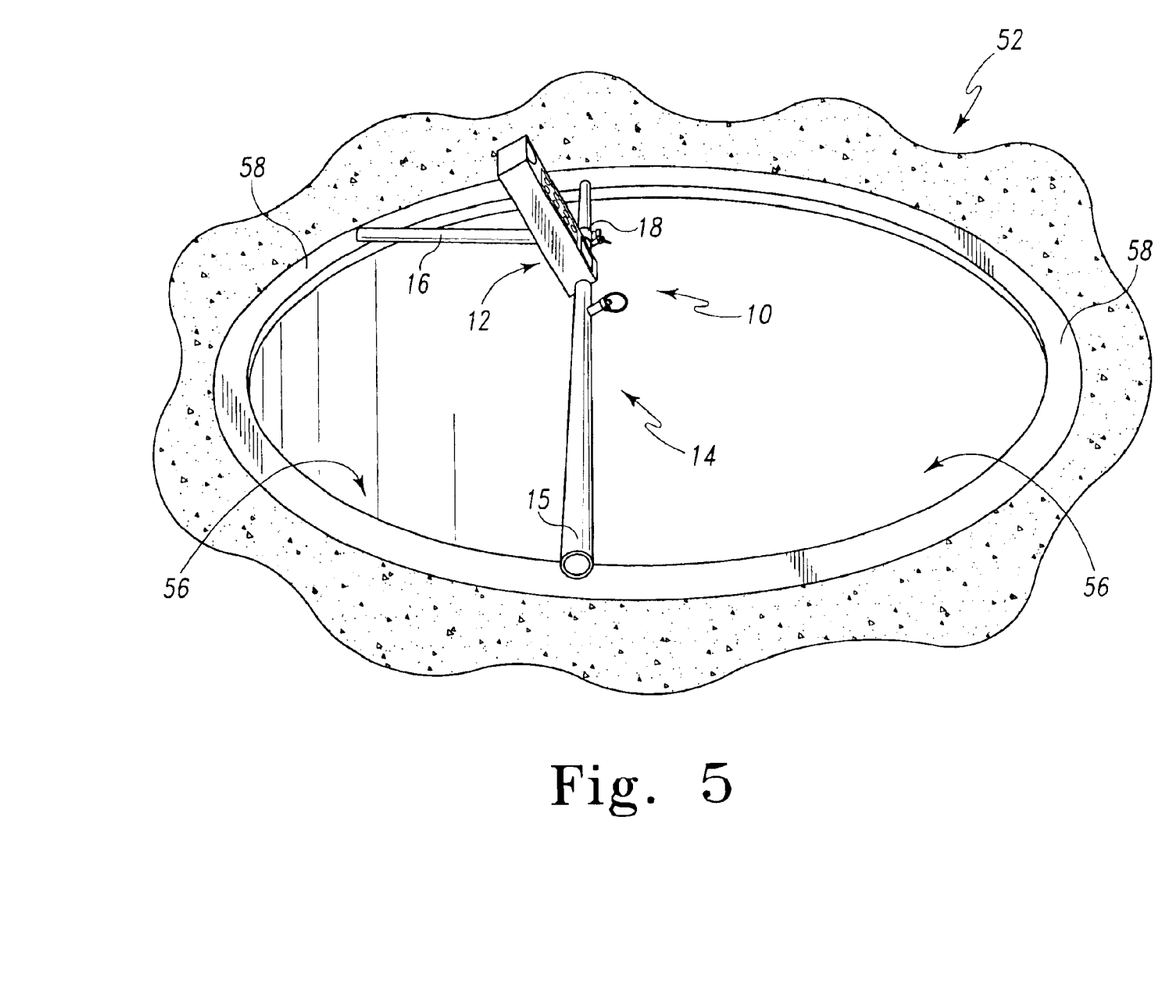
FIG. 5 is a perspective view of the survey device of FIG. 3.
Figure 6:
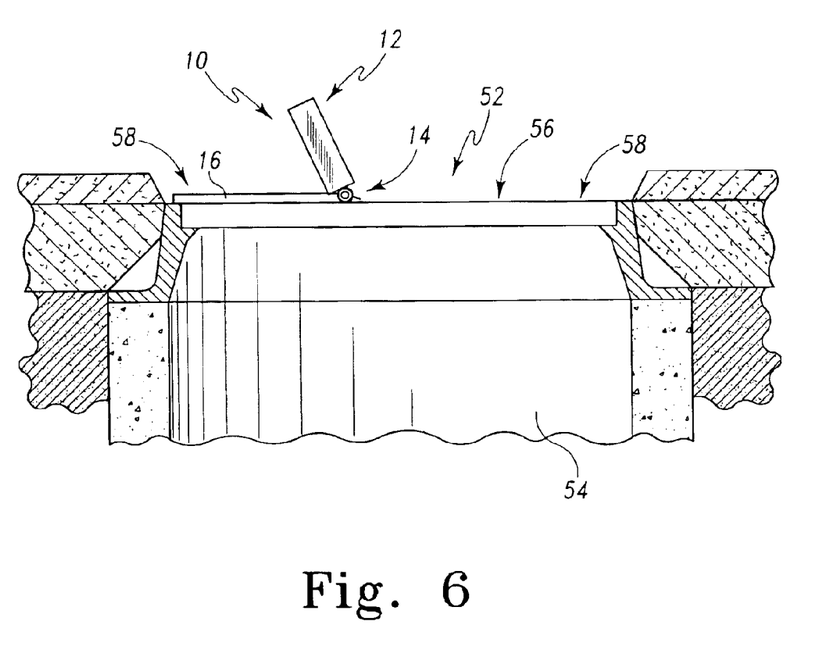
FIG. 6 is a fragmentary front elevation view, taken generally along section lines 6—6 of FIG. 3, of the survey device of FIG. 3.
Figure 7:
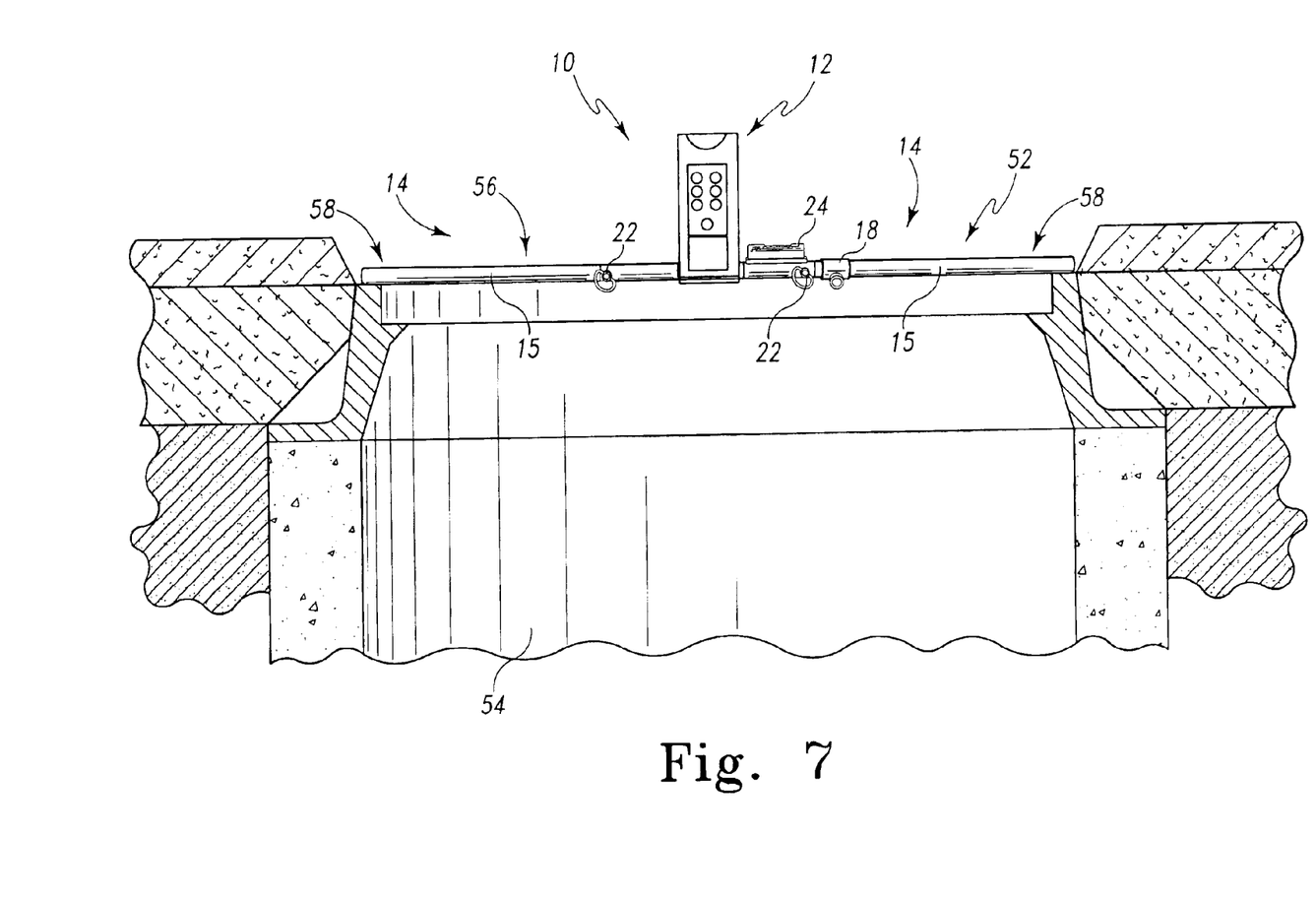
FIG. 7 is a fragmentary side elevation view, taken generally along section lines 7—7 of FIG. 3, of the survey device of FIG. 3.

The elevation of the subterranean architectural feature 50 may be determined by positioning the survey device 10 over an access portal 52, such as a manhole, of a subterranean chamber 54, such as a sewer drain collection chamber, as illustrated in FIGS. 3–7. The survey device 10 is positioned over the access portal 52 so that the support frame 14 spans an opening 56 of the access portal 52 as illustrated in FIGS. 4, 5, and 7. Depending on the length of the cross bar 15, the device 10 may be positioned centrally over the portal 52 or off-center of the portal 52 as illustrated in FIGS. 4 and 5. The device 10 is positioned so that the stabilizer bar 16 contacts an outer rim 58 of the portal 52 as illustrated in FIGS. 4, 5, and 6. Additionally, the device 10 is positioned so that the survey instrument 12 is in alignment with the feature 50 which allows the distance sensor 36 of the survey instrument 12 to be pointed toward the feature 50 as illustrated in FIG. 3. Further, the device 10 is positioned over the access portal 52 so that the distance sensor 36 of the survey instrument 12 is coplanar with the opening 56 of the portal 52 as illustrated in FIG. 7. Positioning the sensor 36 coplanar with the opening 56 of the portal 52 improves the accuracy of measurements performed by the survey device 10 relative to other measurements by utilizing a standard point of reference from which to measure. However, other points of reference may be used in other implementations and applications.

During the positioning of the survey device 10 over the access portal 52, one end of the cross bar 15 may be elevated relative to the opposite end. For example, the outer rim 58 of the portal 52 may not be planar but instead have irregular undulations, deformations, or debris deposited on the rim 58 which may cause one end of the bar 15 to be elevated. Under such a condition, the cross bar 15, and consequently the survey instrument 12, may not be horizontally level over the access portal 52. The indicator 24 provides an indication of the horizontal angular position of the survey device 10 to the user. If the horizontal angular position of the device 10 is not satisfactory, the user may elevate the lower side of the cross bar 15 so as to alter the horizontal angular position of the device 10. The survey device 10 may be leveled using one of a number of methods. For example, spacers may be inserted between one end of the cross bar 15 and the outer rim 58 of the access portal 52. Additionally, the outer rim 58 may be cleaned to improve the planar characteristics of the rim 58.

Once the survey device 10 is positioned over the portal 52, the cross bar 15 and the survey instrument 12 are rotated so that the distance sensor 36 is pointing toward the subterranean architectural feature 50 as shown in FIG. 3. The visual indicator produced by the distance sensor 36 (i.e., the laser focus or "dot") may be used to facilitate in rotating the instrument 12 to the correct surveying position. In some applications, such as those applications in which the elevation of a pipe is to be determined, the instrument 12 is rotated until the laser focus or other visual indicator of the sensor 36 is located on a bottom lip 51 of the feature 50. Once the cross bar 15 and instrument 12 have been rotated to the correct surveying position, the coupler 18 may be tightened to secure the bar 15 and the stabilizer bar 16 in place so as to limit any undesirable repositioning of the instrument 12.

Once the survey instrument 12 has been rotated to a desired position (i.e. the laser focus or other visual indicator is positioned on the subterranean feature 50 or portion of the subterranean feature 50), the user may operate the instrument 12 to determine the elevation of the feature 50. To do so, a user submits an instruction request by selecting the appropriate key or combination of keys from the key pad 31 of the user interface 32. In response, the distance sensor 36 determines the line-of-sight distance from the sensor 36 to the feature 50 and thereafter generates an output signal indicative thereof. The line-of-sight distance from the sensor 36 to the feature 50 is depicted in FIG. 3 by a length d of the line-of-sight line 62 which originates at the sensor 36 and extends to the feature 50. The output signal produced by the distance sensor 36 is electrically transmitted to the microprocessor 28 via the interconnects 40. In some embodiments, the microprocessor 28 stores the data encoded in the output signal from the distance sensor 36 in the memory device 30.

Contemporaneously with operation of the distance sensor 36, the angle sensor 34 produces an output signal indicative of the rotational position of the survey instrument 12 relative to the vertical reference line 60. The rotational position of the survey instrument 12 is found by determining the value of the angle θ defined between the first line 62 and the second, vertical line 60. The output signal produced by the angle sensor 34 is electrically transmitted to the microprocessor 28 via the interconnects 38. In some embodiments, the microprocessor 28 stores data encoded in the output signal from the angle sensor 34 in the memory device 30.

The microprocessor 28 calculates the elevation (i.e., x, the length of the line 60) of the subterranean architecture feature 50 based on the output signals from the distance sensor 36 and the angle sensor 34. In some embodiments, the microprocessor 28 retrieves the data encoded in the output signals from the memory device 30 during the calculation process. In the illustrative embodiment, the microprocessor 28 calculates the elevation by utilizing the trigonometric definition of the sine function:

$$\text{sine } \theta = x/d$$

where x is the length of the first line 60, d is the length of the second line 62 (i.e., the line-of-sight distance between the distance sensor 36 and the feature 50), and θ is the angle defined between the two lines 60, 62. The elevation (i.e., x, the length of the line 60) from the opening 56 to the feature 50 may be determined by using algebraic manipulation of the sine function:

$$x = \text{sine } \theta * d$$

The microprocessor 28 utilizes the above trigonometric equation to determine the elevation of the feature 50. Once the microprocessor 28 has calculated the elevation x, the microprocessor 28 electrically transmits data indicative of the elevation to the user interface 32 via the interconnects 44. The elevation x is presented to the user of the device 10 via the display device 31 of the user interface 32. In some embodiments, the user may also use the key pad 33 to perform additional computations on the displayed data, to perform additional measurements, to store the elevation in the memory device 30, and to perform other functions useful during the process of a survey.

Although the feature 50 illustrated in FIG. 3 is a sewer pipe, the elevation of other types of subterranean architectural features may be determined with the survey device 10. For example, the elevations of such features as wires, cables, drains, holes, fixtures, tubes, and the like may be calculated using the survey device 10. Additionally, the survey device 10 may be used to calculate elevations of non-architectural features. For example, elevations may be found in implementations where the feature 50 is a fixed point of interest such as a fixed distance above a floor.

Figure 8:
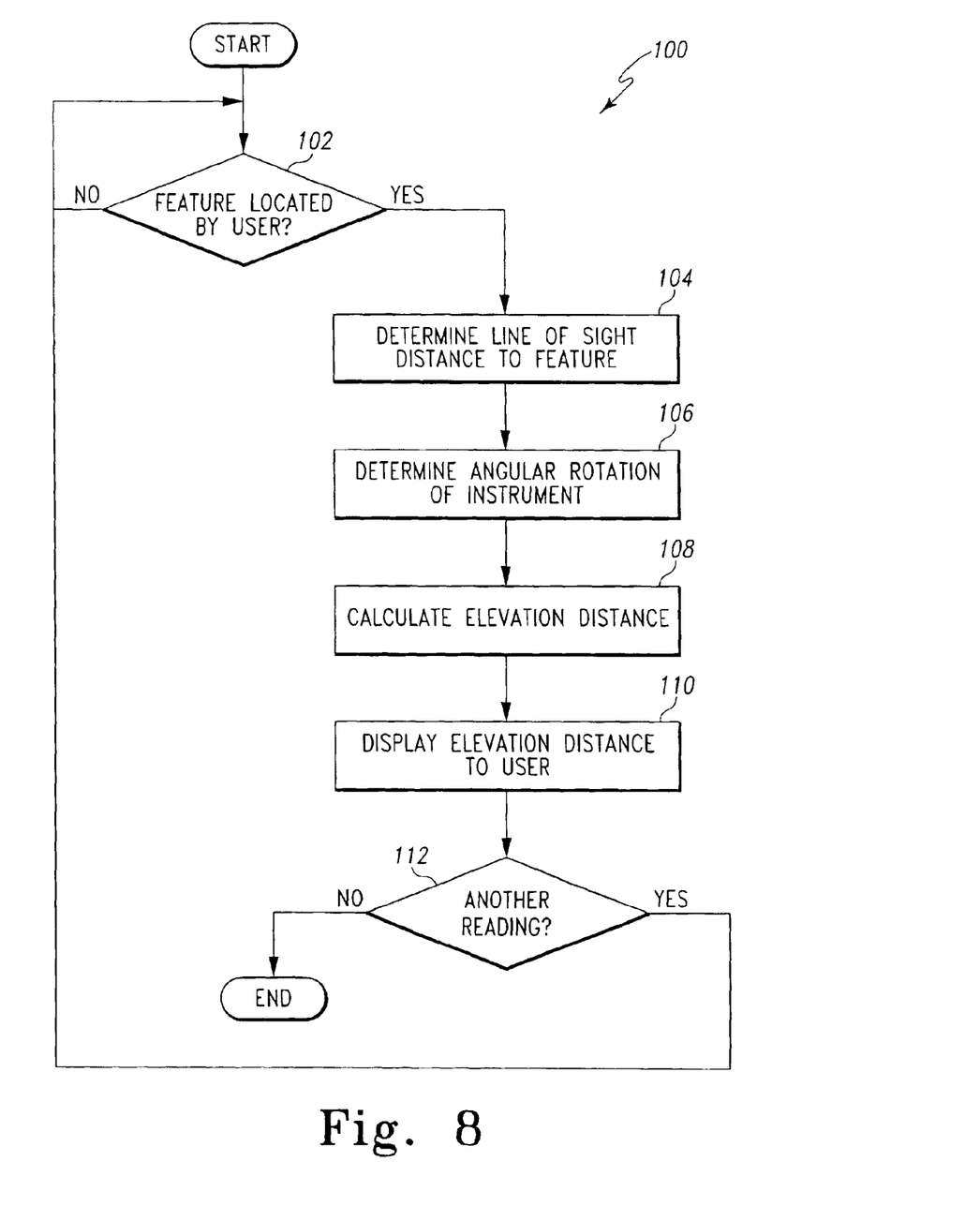
FIG. 8 is a flowchart of a control routine executed by the survey device of FIG. 1.

The elevation of the feature 50 may be determined utilizing a variety of software algorithms. One exemplary software algorithm 100 for determining the elevation of the feature 50 is shown in FIG. 8. The algorithm 100 may be stored in the memory device 30 for execution by the microprocessor 28. The algorithm 100 initiates by determining if the user has located the subterranean architectural feature 50. Once the user has positioned the laser focus or other visual indicator of the distance sensor 36 on a portion of the feature 50, the user may submit an instruction request via the keypad 33 of the user interface 32 to instruct the instrument 12 to determine the elevation of the portion of the feature 50. In step 102, the microprocessor 28 scans or otherwise reads the interconnects 44 for a signal indicative of the instruction request. If no instruction request is received by the microprocessor, the algorithm 100 loops back to continue scanning for an instruction request. If the microprocessor 28 receives the instruction request from the user interface 32, the algorithm 100 advances to step 104.

In step 104, the survey instrument 12 determines the line-of-sight distance from the sensor 36 to the portion of the feature 50 on which the laser focus or other visual indicator is positioned. The distance sensor 36 produces an output signal indicative of the line-of-sight distance to the feature 50 on the electrical interconnects 40. The microprocessor 28 scans or otherwise reads the interconnects 40 for the output signal from the sensor 36. Once the microprocessor 28 receives the output signal from the distance sensor 36, the algorithm 100 advances to process step 106 In process step 106, the angular position of the instrument 12 is determined. The angle sensor 34 produces an output signal indicative of the angular position of the instrument 12 relative to a vertical reference line 60 on the electrical interconnects 38. The microprocessor 28 scans or otherwise reads the interconnects 28 for the output signal from the sensor 34. Once the microprocessor 28 receives the output signal from the angle sensor 34, the algorithm 100 advances to step 108.

The distance from the opening 56 of the of the access portal 52 (e.g., the opening of the manhole) to the feature 50 (i.e., the elevation) is determined in process step 108. The microprocessor 28 calculates the elevation based on the output signals of the distance sensor 36 and the angle sensor 34. In the illustrative embodiment, the microprocessor 28 uses the trigonometric equation described above in regard to FIG. 3. During the calculation process, the microprocessor 28 may retrieve the data encoded in the output signals of the sensors 34, 36 from the memory device 30 if such data was stored therein during steps 104 and 106.

Once the microprocessor 28 has calculated the elevation of the feature 50, the elevation is displayed to the user in process step 110. The microprocessor 28 transmits data indicative of the elevation to the user interface 32 via the interconnects 44. The elevation of the feature 50 is displayed to the user of the instrument 12 via the display device 31.

The user may then select to perform another survey reading or terminate the survey process in process step 112. If the user decides to perform another survey reading, the algorithm 100 loops back to process step 102 to monitor for an instruction request. The algorithm 100 ends if the user decides not to perform another survey reading.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, methods, systems, and programs described herein. It will be noted that alternative embodiments of each of the apparatus, methods, systems, and programs of the present disclosure may not include all of the features described yet still benefit from at least some of the advantages of such features. Those of ordinary skill in the art may readily devise their own implementations of apparatus, methods, systems, and programs that incorporate one or more of the features of the present invention and fall within the spirit and scope of the present disclosure as defined by the appended claims.

What is claimed is:

1. A survey device for determining an elevation of a subterranean architectural feature located in a subterranean chamber, the survey device comprising:

a support frame having a cross bar configured to span an access opening of the subterranean chamber, the cross bar having a first end configured to contact a first portion of a rim of the access opening and a second end configured to contact a second portion of the rim, a first sensor coupled to the support frame and operable to generate a first signal indicative of a line-of-sight distance from the survey device to the subterranean architectural feature located in the subterranean chamber, a second sensor coupled to the support frame and operable to generate a second signal indicative of an angular position of the survey device relative to a vertical reference, and a processor electrically coupled to both the first sensor and the second sensor.

2. The survey device of claim 1, further comprising a housing, the first sensor, the second sensor, and the processor being positioned in the housing.

3. The survey device of claim 2, wherein the housing is secured to the support frame.

4. The survey device of claim 1, further comprising a memory device electrically coupled to the processor, the memory device having stored therein a plurality of instructions which, when executed by the processor, cause the processor to calculate the elevation of the subterranean architectural feature located in the subterranean chamber based on the first signal and the second signal.

5. The survey device of claim 1, further comprising a display device electrically coupled to the processor.

6. The survey device of claim 1, further comprising a keypad electrically coupled to the processor.

7. A method of operating a survey instrument to determine an elevation of a subterranean architectural feature located in a subterranean chamber, the method comprising the steps of:

positioning the survey instrument over an access opening of the subterranean chamber, aiming the survey instrument through the access opening of the subterranean chamber and toward the subterranean architectural feature, determining a line-of-sight distance from the survey instrument to the subterranean architectural feature located in the subterranean chamber and generating a first signal in response thereto, determining an angular position of the survey instrument relative to a vertical reference and generating a second signal in response thereto, and calculating the elevation of the subterranean architectural feature located in the subterranean chamber in response to generation of the first signal and the second signal.

8. The method of claim 7, wherein the line-of-sight determining step comprises operating a distance sensor so as to determine the line-of-sight distance from the survey instrument to the subterranean architectural feature located in the subterranean chamber.

9. The method of claim 7, wherein the angular position determining step comprises operating an angle sensor so as to determine the angular position of the survey instrument relative to the vertical reference.

10. The method of claim 7, further comprising the step of displaying the elevation on a display device subsequent to the calculating step.

11. A survey instrument, comprising:

a support frame having a cross bar configured to span an access opening of a subterranean chamber, a distance sensor coupled to the support frame, an angle sensor coupled to the support frame, a processor electrically coupled to the distance sensor and the angle sensor, and a memory device electrically coupled to the processor, the memory device having stored therein a plurality of instructions which, when executed by the processor, cause the processor to:

operate the distance sensor to determine a line-of-sight distance from the survey instrument to a subterranean architectural feature located in the subterranean chamber and generate a first signal in response thereto, operate the angle sensor to determine an angular position of the survey instrument relative to a vertical reference and generate a second signal in response thereto, and calculate the elevation of the subterranean architectural feature located in the subterranean chamber in response to generation of the first signal and the second signal.

12. The survey instrument of claim 11, further comprising a display device, wherein the plurality of instructions, when executed by the processor, further cause the processor to operate the display device to display the elevation thereon.

13. The survey device of claim 11, further comprising a housing, the distance sensor, the angle sensor, and the processor being positioned in the housing.

14. The survey device of claim 13, wherein the housing is secured to the support frame.

15. A method of operating a survey instrument to determine an elevation of a subterranean architectural feature located in a subterranean chamber, the method comprising the steps of:

positioning the survey instrument over an access opening of the subterranean chamber, aiming the survey instrument through the access opening of the subterranean chamber and toward the subterranean architectural feature, determining a line-of-sight distance from the survey instrument to the subterranean architectural feature located in the subterranean chamber and generating a first signal in response thereto, determining an angular position of the survey instrument relative to a vertical reference and generating a second signal in response thereto, and displaying the elevation of the subterranean architectural feature located in the subterranean chamber on a display device in response to generation of the first signal and the second signal.

16. The method of claim 15, wherein the line-of-sight determining step comprises operating a distance sensor so as to determine the line-of-sight distance from the survey instrument to the subterranean architectural feature located in the subterranean chamber.

17. The method of claim 15, wherein the angular position determining step comprises operating an angle sensor so as to determine the angular position of the survey instrument relative to the vertical reference.

18. The method of claim 15, further comprising the step of calculating the elevation prior to the displaying step.

19. A survey instrument comprising:

a support frame having a cross bar configured to span an access opening of a subterranean chamber, a distance sensor coupled to the support frame, an angle sensor coupled to the support frame, a display device, a processor electrically coupled to each of the distance sensor, the angle sensor, and the display device, and a memory device electrically coupled to the processor, the memory device having stored therein a plurality of instructions which, when executed by the processor, cause the processor to:

operate the distance sensor to determine a line-of-sight distance from the survey instrument to a subterranean architectural feature located in the subterranean chamber and generate a first signal in response thereto, operate the angle sensor to determine an angular position of the survey instrument relative to a vertical reference and generate a second signal in response thereto, and display the elevation of to subterranean architectural feature located in the subterranean chamber on the display device in response to generation of the first signal and the second signal.

20. The survey instrument of claim 19, wherein the plurality of instructions, when executed by the processor, further cause the processor to calculate the elevation prior to display thereof on the display device.

21. The survey device of claim 19, further comprising a housing, wherein:

the distance sensor, the angle sensor, and the processor are positioned in the housing, and the display device is secured to the housing so as to be readable from outside the housing.

22. The survey device of claim 21, wherein the housing is secured to the support frame.

23. A method of operating a survey instrument to determine an elevation of a pipe located in a subterranean chamber of a sewer system, the method comprising the steps of:

positioning the survey instrument over an access opening of the subterranean chamber, aiming the survey instrument through the access opening of the subterranean chamber and toward the pipe located in the subterranean chamber, determining a line-of-sight distance from the survey instrument to the pipe and generating a first signal in response thereto, determining an angular position of the survey instrument relative to a vertical reference and generating a second signal in response thereto, and calculating the elevation of the pipe in response to generation of the first signal and the second signal.

24. The method of claim 23, wherein the line-of-sight determining step comprises operating a distance sensor so as to determine the line-of-sight distance from the survey instrument to the pipe located in the subterranean chamber.

25. The method of claim 23, wherein the angular position determining step comprises operating an angle sensor so as to determine the angular position of the survey instrument relative to the vertical reference.

26. The method of claim 23, further comprising the step of displaying the elevation on a display device subsequent to the calculating step.

* * * * *